United States Patent
Imoto

(10) Patent No.: US 11,105,453 B2
(45) Date of Patent: Aug. 31, 2021

(54) PIPE COUPLING MEMBER HAVING VALVE ELEMENT AND COIL SPRING FOR USE THEREIN

(71) Applicant: NITTO KOHKI CO., LTD., Tokyo (JP)

(72) Inventor: Yuki Imoto, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 426 days.

(21) Appl. No.: 16/144,252

(22) Filed: Sep. 27, 2018

(65) Prior Publication Data

US 2019/0024835 A1 Jan. 24, 2019

Related U.S. Application Data

(63) Continuation of application No. PCT/JP2017/014386, filed on Apr. 6, 2017.

(30) Foreign Application Priority Data

Apr. 7, 2016 (JP) .............................. JP2016-077030

(51) Int. Cl.
*F16L 37/32* (2006.01)
*F16L 37/28* (2006.01)

(52) U.S. Cl.
CPC ............... *F16L 37/32* (2013.01); *F16L 37/28* (2013.01)

(58) Field of Classification Search
CPC . F16L 37/22; F16L 37/23; F16L 37/28; F16L 37/32; F16L 37/30; F16L 37/35;
(Continued)

(56) References Cited

U.S. PATENT DOCUMENTS 3,961,645 A * 6/1976 Kagan ..................... F16L 37/23
137/630.15
5,240,023 A * 8/1993 Shelef ..................... F16L 37/22
137/15.09
(Continued)

FOREIGN PATENT DOCUMENTS

CN 200943730 9/2007
EP 2 042 798 4/2009
(Continued)

OTHER PUBLICATIONS

Extended European Search Report dated Nov. 5, 2019 in European Patent Application No. 17779210.8.
(Continued)

*Primary Examiner* — Aaron M Dunwoody
(74) *Attorney, Agent, or Firm* — Wenderoth, Lind & Ponack, L.L.P.

(57) ABSTRACT

A pipe coupling member is configured to prevent a coil spring from being plastically deformed or dislodged from a coupling body even when a force acts on a valve element. The pipe coupling member includes a coupling body having a fluid passage, a valve element displaceable in the fluid passage, and a coil spring configured to urge the valve element toward a closed position. The coil spring is formed by helically winding a wire and has a fitting portion fitted and secured in a spring fitting groove, a locking portion contiguous with the fitting portion and having an outer diameter larger than an inner diameter of the fitting portion when fitted in the spring fitting groove, a valve support portion supporting the valve element, and an expanding-contracting portion extending between the locking portion and the valve support portion to expand and contract.

10 Claims, 2 Drawing Sheets

(58) Field of Classification Search
CPC . F16L 37/36; F16L 37/38; F16L 37/40; F16L 37/42; F16L 37/44
USPC ..... 285/317, 316, 308; 137/614–614.06, 798
See application file for complete search history.

(56) References Cited

U.S. PATENT DOCUMENTS

2007/0062603 A1    3/2007   Mackey et al.
2009/0091129 A1    4/2009   Moriiki et al.

FOREIGN PATENT DOCUMENTS

| | | |
|---|---|---|
| GB | 2 224 334 | 5/1990 |
| JP | 49-100222 | 8/1974 |
| JP | 61-92373 | 5/1986 |
| JP | 63-88395 | 4/1988 |
| JP | 9-203472 | 8/1997 |
| JP | 2009-108979 | 5/2009 |
| JP | 4798510 | 8/2011 |
| JP | 4912375 | 1/2012 |
| WO | 2005/089482 | 9/2005 |

OTHER PUBLICATIONS

Office Action dated Aug. 20, 2019 in corresponding Chinese Application No. 201780021749.6.
International Search Report dated Jun. 20, 2017 in International (PCT) Application No. PCT/JP2017/014386.

* cited by examiner

PIPE COUPLING MEMBER HAVING VALVE ELEMENT AND COIL SPRING FOR USE THEREIN

TECHNICAL FIELD

The present invention relates to a pipe coupling member having a valve element and also relates to a coil spring for use in the pipe coupling member.

BACKGROUND ART

There is known a pipe coupling member having a valve mechanism comprising a cylindrical coupling body having a fluid passage, a valve element disposed in the fluid passage to open and close the fluid passage, and a coil spring urging the valve element toward a closed position where the valve element closes the fluid passage. In conventional pipe coupling members having a valve mechanism arranged as stated above, the coupling body is formed from two splittable members in order to install the coil spring in the coupling body as in a pipe coupling disclosed in Patent Literature 1, for example, or a member for supporting one end of the coil spring is attached to the coupling body as in a pipe coupling shown in FIGS. 1 to 9 of Patent Literature 2, for example. Thus, either of the conventional techniques suffer from a complicated structure.

To solve the above-described problem, a pipe coupling member shown in FIGS. 16 and 17 of Patent Literature 2, for example, is configured as follows. An annular groove is provided on the inner peripheral surface of the coupling body, and the coil spring is provided with an enlarged-diameter portion larger in diameter than the other portion thereof. With this structure, the coil spring is installed in the coupling body by fitting the enlarged-diameter portion of the coil spring into the annular groove of the coupling body. In this case, the enlarged-diameter portion of the coil spring can be reduced in diameter by applying a radially inward force to the enlarged-diameter portion. Therefore, the coil spring can be inserted into the fluid passage through a portion of the fluid passage that is smaller in diameter than the enlarged-diameter portion. Accordingly, it is unnecessary to split the coupling body or to attach another member for supporting the coil spring to the coupling body, as has been stated above, and thus the structure can be simplified.

CITATION LIST

Patent Literature

Patent Literature 1: Japanese Patent Number 4798510
Patent Literature 2: Japanese Patent Number 4912375

SUMMARY OF INVENTION

Technical Problem

The coil spring having an enlarged-diameter portion as stated above suffers, however, from the following problems. When an excessive force acts on the coil spring as a result of the valve element being pressed by a fluid flowing through the fluid passage at high speed, a part of the coil spring may be displaced considerably so as to pass through the inside of the enlarged-diameter portion, which may cause the coil spring to be plastically deformed at the displaced portion thereof. When the coil spring is deformed to such a large extent, the enlarged-diameter portion may be pulled inward by the deformed portion and disengaged from the groove undesirably.

Under the above-described circumstances, it is an object of the present invention to provide a pipe coupling member having a coil spring installed in a coupling body by engaging an enlarged-diameter fitting portion of the coil spring into a spring fitting groove in a fluid passage, the pipe coupling member being configured to prevent the coil spring from being plastically deformed or dislodged from the coupling body even when a large force acts on a valve element, and to also provide a pipe coupling comprising the pipe coupling member and a pipe coupling member associated with the first-mentioned pipe coupling member, and a coil spring for use in the pipe coupling member and the pipe coupling.

Solution to Problem

The present invention provides a pipe coupling member including the following constituent elements: a cylindrical coupling body having a fluid passage and an annular spring fitting groove formed on an inner peripheral surface of the fluid passage; a valve element disposed in the fluid passage, the valve element being displaceable in a direction of a longitudinal axis of the fluid passage between a closed position where the valve element closes the fluid passage and an open position where the valve element opens the fluid passage; and a coil spring formed by helically winding a wire, the coil spring being disposed between the coupling body and the valve element to urge the valve element toward the closed position. The coil spring has the following portions: a fitting portion having an outer diameter larger than the inner diameter of the fluid passage, the fitting portion being fitted and secured in the spring fitting groove; a locking portion contiguous with the fitting portion and having an outer diameter larger than the inner diameter of the fitting portion when fitted in the spring fitting groove; a valve support portion supporting the valve element; and an expanding-contracting portion extending between the locking portion and the valve support portion to expand and contract in the direction of the longitudinal axis when the valve element is displaced between the closed position and the open position.

In the pipe coupling member, the coil spring is secured to the coupling body by fitting the fitting portion in the spring fitting groove of the coupling body. Accordingly, the coupling body can be simplified in structure, and it is easy to install the coil spring in the coupling body. In addition, because the coil spring has a locking portion having an outer diameter larger than the inner diameter of the fitting portion when fitted in the spring fitting groove, when the coil spring is compressed to a considerable extent as a result of the valve element receiving a large force from the fluid, the locking portion is abutted and supported by the fitting portion. Thus, the locking portion, which is contiguous with the fitting portion, is prevented from being deformed considerably so as to pass through the fitting portion. Further, because the fitting portion is held by the locking portion, no radially inward force acts on the fitting portion. Accordingly, the fitting portion is prevented from being reduced in diameter and disengaged from the spring fitting groove.

Preferably, the locking portion may be adjacent to the fitting portion in the direction of the longitudinal axis.

More preferably, the locking portion may be formed by winding the wire a plurality of turns such that the turns of wire are adjacent to each other in the direction of the longitudinal axis.

By configuring the locking portion as stated above, the locking portion can be increased in stiffness, and the locking condition of the locking portion with respect to the fitting portion can be stabilized even more.

Preferably, the arrangement may be as follows. The locking portion is in contact at an outer peripheral surface thereof with the inner peripheral surface of the fluid passage. The expanding-contracting portion has an outer diameter smaller than the outer diameter of the locking portion, so that a clearance is formed between the expanding-contracting portion and the inner peripheral surface of the fluid passage.

Thus, the locking portion is in contact at an outer peripheral surface thereof with the inner peripheral surface of the fluid passage; therefore, it is possible to stabilize the attitude of the coil spring relative to the coupling body. On the other hand, the expanding-contracting portion is not in contact with the inner peripheral surface of the fluid passage. Therefore, the expansion and contraction of the expanding-contracting portion cannot be interfered with, and the force urging the valve element can be maintained in a stable state.

Preferably, the outer diameter of the expanding-contracting portion may be larger than the inner diameter of the locking portion.

With the above-described structure, the expanding-contracting portion overlaps the locking portion as seen in the direction of the longitudinal axis. Accordingly, even when the coil spring is compressed to a considerable extent, the expanding-contracting portion is supported by the locking portion and prevented from being deformed considerably so as to pass through the locking portion.

Preferably, the spring fitting groove has a depth less than the diameter of the wire constituting the coil spring.

The coil spring when compressed is usually forced to increase its diameter. In this regard, because the depth of the spring fitting groove is set less than the diameter of the wire constituting the coil spring, even if the fitting portion of the coil spring is enlarged in diameter, it is possible to maintain a state where at least a part of the fitting portion is always projecting inward from the inner peripheral surface of the fluid passage. Accordingly, it is possible to prevent the fitting portion from disengaging from the locking portion in the direction of the longitudinal axis, which would otherwise be caused by radially outward displacement of the fitting portion.

Preferably, the arrangement may be as follows. The valve element has a circular columnar spring support portion projecting toward the coil spring. The valve support portion of the coil spring is formed by winding the wire a plurality of turns along the outer peripheral surface of the spring support portion such that the turns of wire are adjacent to each other in the direction of the longitudinal axis.

With the above-described structure, the valve element can be retained in a stable state, and backlash of the valve element can be reduced.

Preferably, the arrangement may be as follows. The expanding-contracting portion has a substantially uniform diameter along the longitudinal axis. The valve support portion is smaller in diameter than the expanding-contracting portion. The coil spring has a connecting portion connecting the valve support portion and the expanding-contracting portion. The connecting portion has, as seen in the direction of the longitudinal axis, a first region extending radially outward from the valve support portion and curvedly extending so as to overlap a part of the expanding-contracting portion, a second region extending from the first region so as to overlap a part of the valve support portion, and a third region curvedly extending from the second region so as to overlap another part of the expanding-contracting portion. When the coil spring is compressed in the direction of the longitudinal axis, the first region and third region of the connecting portion abut against the expanding-contracting portion, and the second region of the connecting portion abuts against the valve support portion, thereby allowing the valve support portion to be supported by the expanding-contracting portion through the connecting portion.

When the expanding-contracting portion is compressed, the gap between the turns of wire is reduced; therefore, the resistance to the fluid passing through the gap increases. In this regard, however, because the above-described connecting portion is provided between the expanding-contracting portion and the valve support portion, which are different in diameter from each other, the fluid can flow through the connecting portion regardless of the way in which the coil spring is compressed. Consequently, it is possible to suppress the increase in fluid resistance due to the compression of the coil spring. Further, when the coil spring is compressed, the valve support portion and the expanding-contracting portion are supported by the connecting portion. Therefore, the valve support portion is prevented from being displaced considerably to the inside of the expanding-contracting portion.

In addition, the present invention provides a pipe coupling including the above-described pipe coupling member, and an associated pipe coupling member configured to be detachably couplable to the pipe coupling member. The pipe coupling is configured such that, when the pipe coupling member and the associated pipe coupling member are coupled to each other, the valve element of the pipe coupling member is displaced from the closed position to the open position by being pressed by the associated pipe coupling member.

In addition, the present invention provides a coil spring configured to be set in a fluid passage to urge a valve element set in the fluid passage displaceably in a direction of a longitudinal axis of the fluid passage toward a closed position where the valve element closes the fluid passage from an open position where the valve element opens the fluid passage. The coil spring has the following portions: a fitting portion having an outer diameter larger than an inner peripheral surface of the fluid passage, the fitting portion being configured to be secured to the fluid passage by being fitted in a circumferential spring fitting groove formed on the inner peripheral surface; a locking portion contiguous with the fitting portion and having an outer diameter larger than the inner diameter of the fitting portion when fitted in the spring fitting groove; a valve support portion configured to support the valve element; and an expanding-contracting portion extending between the locking portion and the valve support portion and having an outer diameter larger than the inner diameter of the locking portion, the expanding-contracting portion being configured to expand and contract in the direction of the longitudinal axis when the valve element is displaced between the closed position and the open position.

Embodiments of a pipe coupling member, a pipe coupling, and a coil spring according to the present invention will be explained below on the basis of the accompanying drawings.

DESCRIPTION OF EMBODIMENTS

Figure 1:
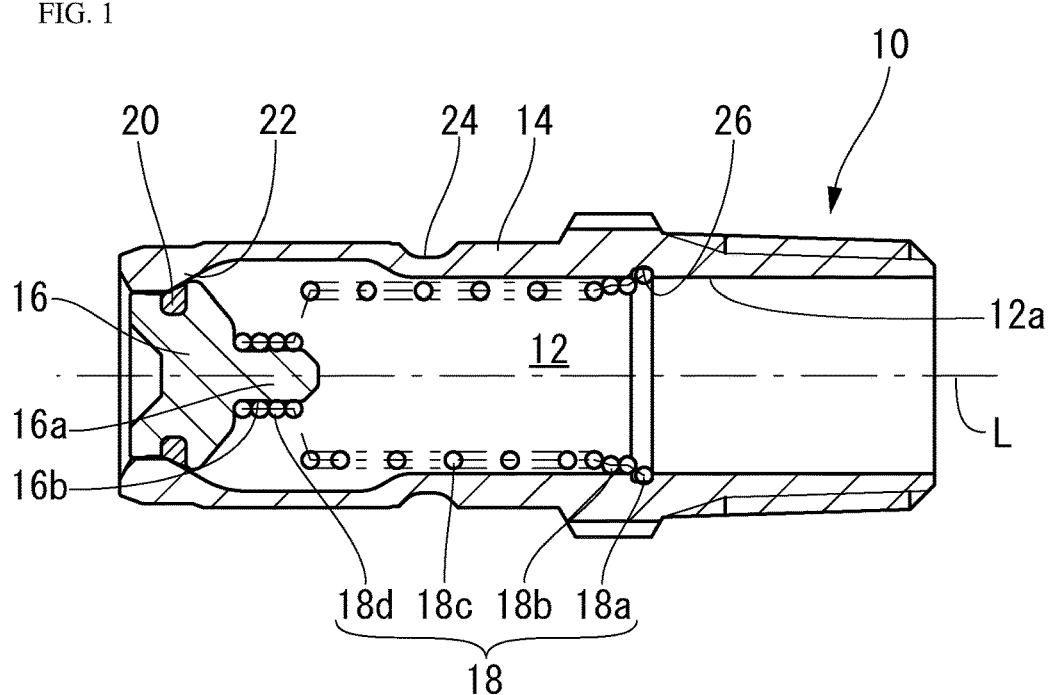
FIG. 1 is a sectional side view of a male pipe coupling member according to an embodiment of the present invention.

A male pipe coupling member (pipe coupling member) 10 according an embodiment of the present invention includes, as shown in FIG. 1, a circular cylindrical coupling body 14 having a fluid passage 12, a valve element 16 disposed in the fluid passage 12, and a coil spring 18 disposed between the coupling body 14 and the valve element 16 in the fluid passage 12. The valve element 16 is displaceable between a closed position (FIG. 1) where a seal ring 20 sealingly engages a valve seat portion 22 of the coupling body 14 to close the fluid passage 12, and an open position (FIG. 3) where the valve element 16 retracts from the closed position in the direction of a longitudinal axis L of the fluid passage 12 (i.e. the valve element 16 is displaced rightward as seen in the figure) to open the fluid passage 12. The coil spring 18 urges the valve element 16 toward the closed position.

Figure 2:
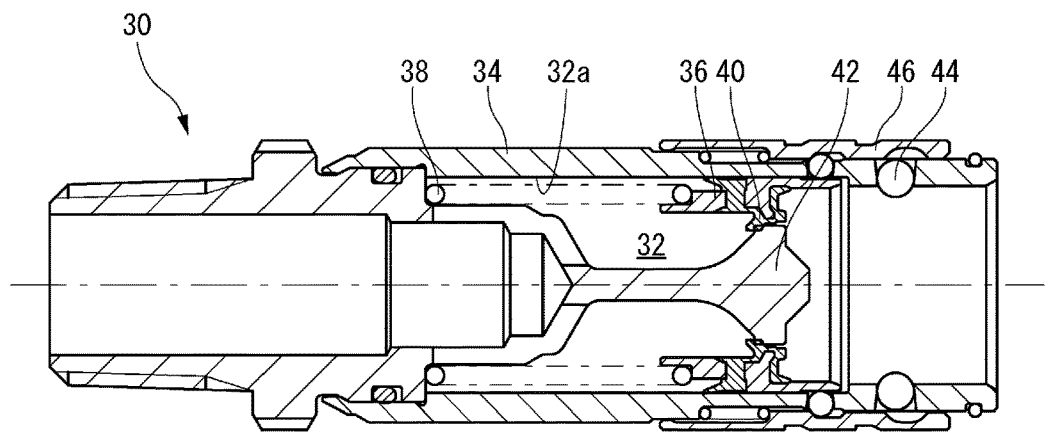
FIG. 2 is a sectional side view of a female pipe coupling member to be coupled to the male pipe coupling member shown in FIG. 1.

An associated female pipe coupling member (associated pipe coupling member) 30 is detachably couplable to the male pipe coupling member 10 and has, as shown in FIG. 2, a circular cylindrical coupling body 34 having a fluid passage 32, a slide valve element 36 sliding along an inner peripheral surface 32a of the fluid passage 32, and a coil spring 38 urging the slide valve element 36 so that a seal ring 40 of the slide valve element 36 sealingly engages a valve seat portion 42 disposed in the center of the fluid passage 32. In addition, the coupling body 34 retains a locking element 44 for locking the male pipe coupling member 10 in a coupled state.

Figure 3:
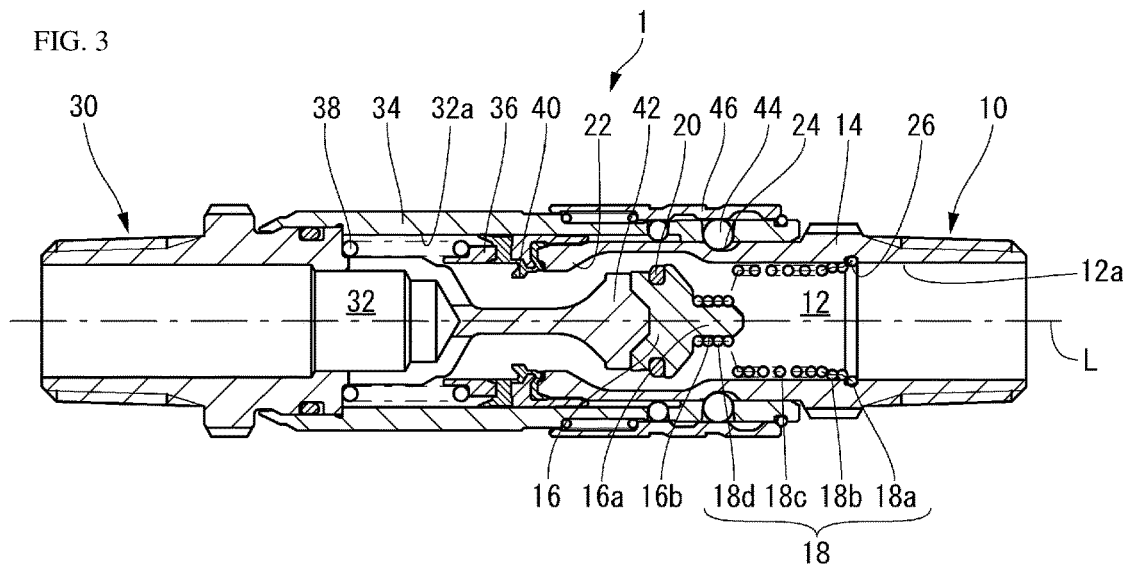
FIG. 3 is a sectional side view showing the way in which the male pipe coupling member in FIG. 1 and the female pipe coupling member in FIG. 2 are coupled to each other.

When the male pipe coupling member 10 is inserted into the female pipe coupling member 30, as shown in FIG. 3, the slide valve element 36 of the female pipe coupling member 30 is pressed leftward as seen in the figure by the coupling body 14 of the male pipe coupling member 10. As a result, the female-side fluid passage 32 is opened. At the same time, the valve element 16 of the male pipe coupling member 10 is pressed rightward as seen in the figure by the valve seat portion 42 of the female pipe coupling member 30. As a result, the male-side fluid passage 12 is also opened. At this time, the locking element 44 of the female pipe coupling member 30 is engaged in a locking element engaging groove 24 of the male pipe coupling member 10 and supported from radially outside by a sleeve 46 in the state of being engaged in the locking element engaging groove 24, thereby undetachably locking the male pipe coupling member 10 to the female pipe coupling member 30. A pipe coupling 1 comprising the male pipe coupling member 10 and the female pipe coupling member 30 is coupled in this way, and the fluid passages 12 and 32 of the male and female pipe coupling members 10 and 30 are communicated with each other.

Figure 4A:
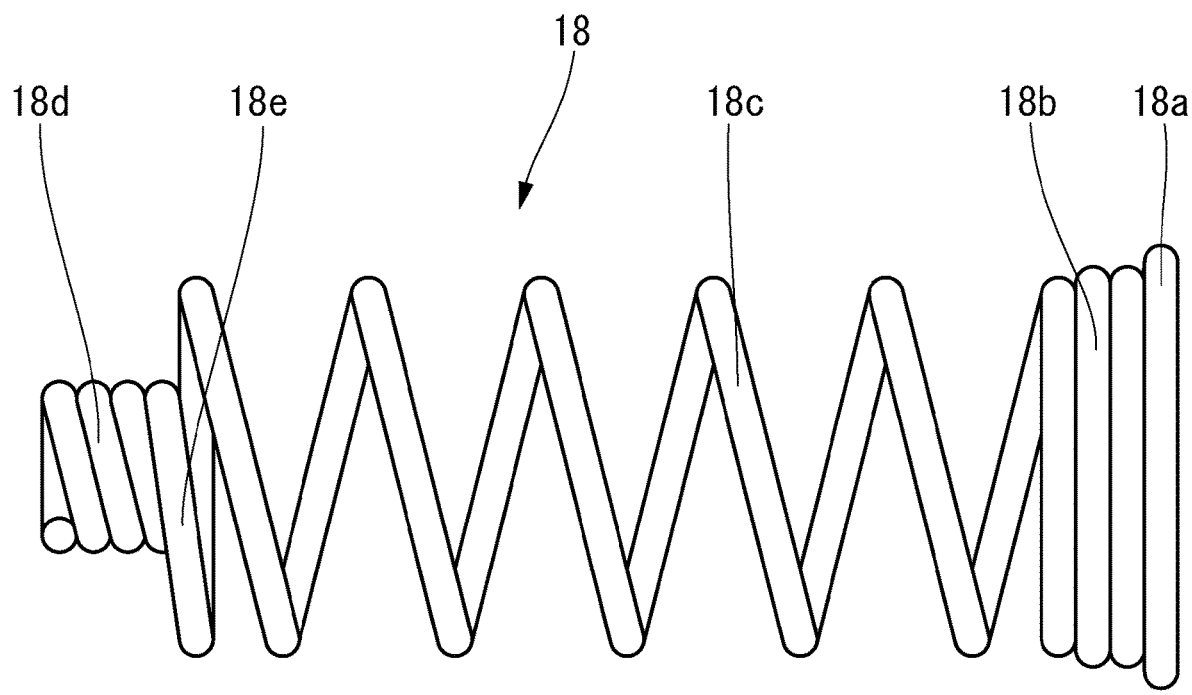
FIG. 4A is a side view of a coil spring for use in the male pipe coupling member shown in FIG. 1.
Figure 4B:
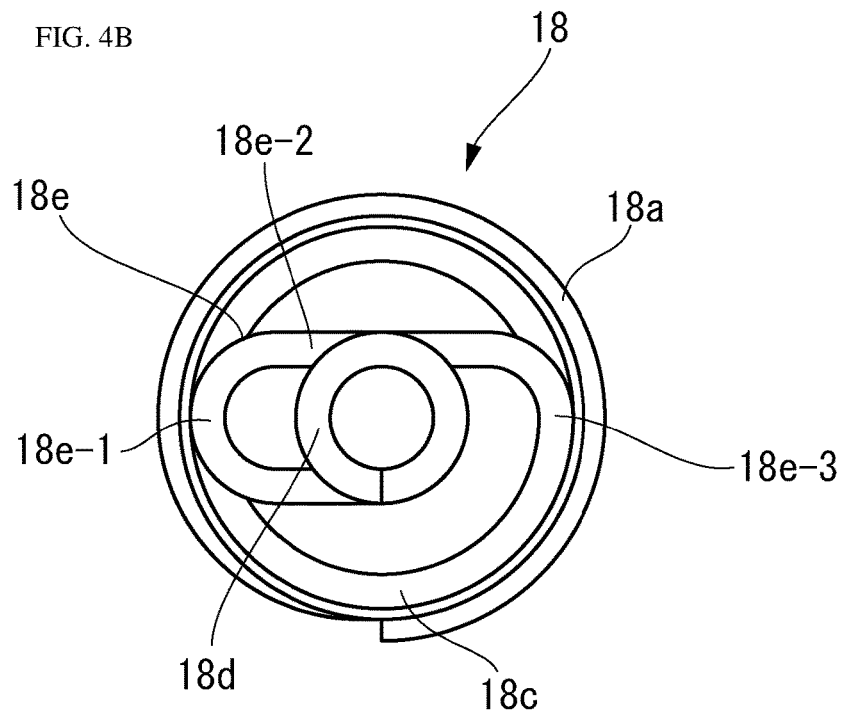
FIG. 4B is a front view of the coil spring shown in FIG. 4A.

The coil spring 18 of the male pipe coupling member 10 is, as shown in FIG. 4A, formed by helically winding a thin wire of circular cross-section. The coil spring 18 has the following portions: a fitting portion 18a formed by winding the wire approximately one turn; a locking portion 18b formed contiguously with the fitting portion 18a by winding the wire approximately 2 turns such that the turns of wire are longitudinally adjacent to each other with a diameter slightly smaller than that of the fitting portion 18a; an expanding-contracting portion 18c formed contiguously with the locking portion 18b by winding the wire approximately 6 turns such that the turns of wire are spaced from each other in the direction of the longitudinal axis L; and a valve support portion 18d formed by winding the wire approximately 3 turns such that the turns of wire are adjacent to each other in the direction of the longitudinal axis L with a diameter smaller than that of the expanding-contracting portion 18c. In addition, between the expanding-contracting portion 18c and the valve support portion 18d is formed a connecting portion 18e connecting these portions 18c and 18d, as shown in FIG. 4B. The connecting portion 18e comprises the following regions, as seen in the direction of FIG. 4B (i.e. as seen from the direction of the longitudinal axis L): a first region 18e-1 extending radially outward in the left direction from the valve support portion 18d and curvedly extending so as to overlap a part of the expanding-contracting portion 18c; a second region 18e-2 rectilinearly extending rightward from the first region 18e-1 so as to overlap a part of the valve support portion 18d at a halfway point thereof; and a third region 18e-3 curvedly extending from the second region 18e-2 so as to overlap a part of the expanding-contracting portion 18c and connecting to the expanding-contracting portion 18c. When the coil spring 18 is compressed, the first and third regions 18e-1 and 18e-3 of the connecting portion 18e engage the expanding-contracting portion 18c, and the second region 18e-2 of the connecting portion 18e engages the valve support portion 18d. Consequently, the valve support portion 18d is supported by the expanding-contracting portion 18c through the connecting portion 18e, thereby preventing the valve support portion 18d from being displaced to the inside of the connecting portion 18c.

The coupling body 14 of the male pipe coupling member 10 has, as shown in FIG. 1, an annular spring fitting groove 26 on an inner peripheral surface 12a of the fluid passage 12. The coil spring 18 has the fitting portion 18a fitted in the spring fitting groove 26, thereby being secured to the coupling body 14. It should be noted that the fitting portion 18a can be reduced in diameter by applying a radially inward force thereto; therefore, the coil spring 18 is inserted into the fluid passage 12 with the fitting portion 18a reduced in diameter when the coil spring 18 is to be installed. When the fitting portion 18a reaches the spring fitting groove 26 as the coil spring 18 is inserted into the fluid passage 12, the fitting portion 18a returns to the enlarged-diameter form by its elasticity. Thus, the fitting portion 18a is fitted into the spring fitting groove 26. Accordingly, the use of the coil spring 18 makes it unnecessary to split the coupling body 14 or to attach another member for retaining the coil spring 18.

The spring fitting groove 26 has a depth less than the diameter of the wire constituting the coil spring 18, so that a part of the fitting portion 18a is always projecting inward from the inner peripheral surface 12a of the fluid passage 12 when the fitting portion 18a is fitted in the spring fitting groove 26. Meanwhile, the locking portion 18b is in contact with the inner peripheral surface 12a of the fluid passage 12. With these configurations of the fitting portion 18a and the locking portion 18b, the outer diameter of the locking portion 18b is larger than the inner diameter of the fitting portion 18a when the coil spring 18 is installed in the coupling body 14. In addition, because the locking portion 18b is in contact with the inner peripheral surface 12a of the fluid passage 12, the attitude of the coil spring 18 relative to the coupling body 14 is stabilized. The expanding-contracting portion 18c is formed to have a uniform diameter along the longitudinal axis L, and the outer diameter of the expanding-contracting portion 18c is smaller than the outer diameter of the locking portion 18b, so that a clearance is formed between the expanding-contracting portion 18c and the inner peripheral surface 12a of the fluid passage 12. In addition, the expanding-contracting portion 18c has an outer diameter larger than the inner diameter of the locking portion 18b so as to overlap the locking portion 18b as seen in the direction of the longitudinal axis L.

The valve element 16 has a circular columnar spring support portion 16a projecting toward the coil spring 18 in the direction of the longitudinal axis L. The valve support portion 18d of the coil spring 18 is formed by being helically wound along an outer peripheral surface 16b of the spring support portion 16a. The valve element 16 is retained by the coil spring 18 in a state where the spring support portion 16a is inserted into the valve support portion 18d of the coil spring 18. Because of being retained as stated above, the valve element 16 is reduced in backlash relative to the coil spring 18 and thus stabilized in attitude.

When the male pipe coupling member 10 is coupled to the female pipe coupling member 30 to reach the state shown in FIG. 3, the coil spring 18 is compressed in the direction of the longitudinal axis L. At this time, only the expanding-contracting portion 18c is mainly compressed. In this regard, however, because the expanding-contracting portion 18c is configured not to contact the inner peripheral surface 12a of the fluid passage 12, there is basically no friction between the expanding-contracting portion 18c and the fluid passage 12 when the coil spring 18 is compressed, which friction would otherwise interfere with the expansion and contraction of the coil spring 18.

When the coil spring 18 is installed in the coupling body 14, the outer diameter of the locking portion 18b is larger than the inner diameter of the fitting portion 18a, as has been stated above. Accordingly, the locking portion 18b, which receives a rightward force from the expanding-contracting portion 18c as seen in the figure, engages the fitting portion 18a and is supported by the fitting portion 18a. Consequently, the locking portion 18b is prevented from being displaced so as to pass through the fitting portion 18a. Similarly, the outer diameter of the expanding-contracting portion 18c is larger than the inner diameter of the locking portion 18b; therefore, the expanding-contracting portion 18c is supported by the locking portion 18b and thus prevented from being displaced so as to pass through the locking portion 18b. Further, the valve support portion 18d is supported by the expanding-contracting portion 18c through the connecting portion 18e. Therefore, the valve support portion 18d is prevented from being displaced so as to pass through the expanding-contracting portion 18c. That is, the coil spring 18 is configured such that, when the coil spring 18 is compressed to a considerable extent, each pair of mutually adjacent ones of the fitting portion 18a, the locking portion 18b, the expanding-contracting portion 18c, the connecting portion 18e, and the valve support portion 18d engage and support each other in the direction of the longitudinal axis L. Therefore, when compressed completely, the expanding-contracting portion 18c cannot be deformed any further, and the compressed form of the expanding-contracting portion 18c is maintained. For example, when the fluid flows through the fluid passage 12 at high speed, the valve element 16 may be separated from the valve seat portion 42 of the female pipe coupling member 30 and further displaced rightward by the flow of fluid, causing the expanding-contracting portion 18c to be compressed completely, and thus resulting in application of large compressive force to the coil spring 18. Even in such a case, the coil spring 18 is prevented from being deformed to such a considerable extent that the coil spring 18 is plastically deformed because each pair of mutually adjacent portions of the coil spring 18 support each other in the direction of the longitudinal axis L. In addition, the fitting portion 18a receives a radially outward force from the locking portion 18b because the fitting portion 18a is pressed by the locking portion 18b at the inner portion thereof. Accordingly, the fitting portion 18a is prevented from being reduced in diameter to disengage from the spring fitting groove 26 as the coil spring 18 is compressed.

In the male pipe coupling member 10 according to the present invention, the structure of the coupling body 14 can be simplified extremely by using the coil spring 18 configured as stated above, and it also becomes easy to install the coil spring 18 in the coupling body 14. Further, the coil spring 18 can hardly be plastically deformed because the coil spring 18 is configured so as not to be deformed excessively even when a large compressive force is applied thereto. Further, because the fitting portion 18a is pressed from the inner side by the locking portion 18b, no radially inward force acts on the fitting portion 18a. Accordingly, the fitting portion 18a is prevented from being reduced in diameter to disengage from the spring fitting groove 26.

It should be noted that, although in the foregoing embodiment the coil spring 18 shown in FIGS. 4A and 4B is used in the male pipe coupling member, the coil spring 18 may also be used in the female pipe coupling member.

LIST OF REFERENCE SIGNS

Pipe coupling 1; male pipe coupling member 10; fluid passage 12; inner peripheral surface 12a; coupling body 14; valve element 16; spring support portion 16a; outer peripheral surface 16b; coil spring 18; fitting portion 18a; locking portion 18b; expanding-contracting portion 18c; valve support portion 18d; connecting portion 18e; first region 18e-1; second region 18e-2; third region 18e-3; seal ring 20; valve seat portion 22; locking element engaging groove 24; spring fitting groove 26; female pipe coupling member 30; fluid passage 32; inner peripheral surface 32a; coupling body 34; slide valve element 36; coil spring 38; seal ring 40; valve seat portion 42; locking element 44; sleeve 46; longitudinal axis L.

The invention claimed is:

1. A pipe coupling member comprising:
a cylindrical coupling body having a fluid passage and an annular spring fitting groove formed on an inner peripheral surface of the fluid passage;
a valve element disposed in the fluid passage, the valve element being displaceable in a direction of a longitudinal axis of the fluid passage between a closed position where the valve element closes the fluid passage and an open position where the valve element opens the fluid passage; and
a coil spring formed by helically winding a wire, the coil spring being disposed between the coupling body and the valve element to urge the valve element toward the closed position,
wherein the coil spring has:
a fitting portion having an outer diameter larger than an inner diameter of the fluid passage, the fitting portion being fitted and secured in the annular spring fitting groove;

a locking portion contiguous with the fitting portion and having an outer diameter larger than an inner diameter of the fitting portion when fitted in the annular spring fitting groove, the locking portion being formed by winding the wire a plurality of first turns such that the first turns of the wire are adjacent to each other in the direction of the longitudinal axis of the fluid passage;

a valve support portion supporting the valve element;

an expanding-contracting portion formed by winding the wire a plurality of second turns such that the second turns of the wire are spaced from each other in the direction of the longitudinal axis of the fluid passage, the expanding-contracting portion extending between the locking portion and the valve support portion to expand and contract in the direction of the longitudinal axis of the fluid passage when the valve element is displaced between the closed position and the open position.

2. The pipe coupling member of claim 1, wherein the locking portion is adjacent to the fitting portion in the direction of the longitudinal axis of the fluid passage.

3. The pipe coupling member of claim 1, wherein:

an outer peripheral surface of the locking portion is in contact with the inner peripheral surface of the fluid passage; and the expanding-contracting portion has an outer diameter smaller than the outer diameter of the locking portion, so that a clearance is formed between the expanding-contracting portion and the inner peripheral surface of the fluid passage.

4. The pipe coupling member of claim 3, wherein the outer diameter of the expanding-contracting portion is larger than an inner diameter of the locking portion.

5. The pipe coupling member of claim 1, wherein the annular spring fitting groove has a depth less than a diameter of the wire constituting the coil spring.

6. The pipe coupling member of claim 1, wherein:

the valve element has a circular columnar spring support portion projecting toward the coil spring; and the valve support portion of the coil spring is formed by winding the wire a plurality of third turns along an outer peripheral surface of the circular columnar spring support portion such that the third turns of wire are adjacent to each other in the direction of the longitudinal axis of the fluid passage.

7. The pipe coupling member of claim 1, wherein:

the valve support portion is smaller in diameter than the expanding-contracting portion;

the coil spring has a connecting portion connecting the valve support portion and the expanding-contracting portion;

the connecting portion has, as seen in the direction of the longitudinal axis of the fluid passage, a first region extending radially outward from the valve support portion and curvedly extending so as to overlap a first part of the expanding-contracting portion, a second region extending from the first region so as to overlap a part of the valve support portion, and a third region curvedly extending from the second region so as to overlap a second part of the expanding-contracting portion; and the coil spring is configured such that, when the coil spring is compressed in the direction of the longitudinal axis of the fluid passage, the first region of the connecting portion and the third region of the connecting portion abut against the expanding-contracting portion, and the second region of the connecting portion abuts against the valve support portion, thereby allowing the valve support portion to be supported by the expanding-contracting portion through the connecting portion.

8. A pipe coupling comprising:

the pipe coupling member of claim 1, the pipe coupling member being a first pipe coupling member; and a second pipe coupling member configured to be detachably couplable to the first pipe coupling member;

wherein, when the first pipe coupling member and the second pipe coupling member are coupled to each other, the valve element of the first pipe coupling member is displaced from the closed position to the open position by being pressed by the second pipe coupling member.

9. A coil spring configured to be set in a fluid passage to urge a valve element set in the fluid passage displaceably in a direction of a longitudinal axis of the fluid passage toward a closed position where the valve element closes the fluid passage from an open position where the valve element opens the fluid passage, the coil spring comprising:

a fitting portion having an outer diameter larger than an inner peripheral surface of the fluid passage, the fitting portion being configured to be secured to the fluid passage by being fitted in a circumferential spring fitting groove formed on the inner peripheral surface of the fluid passage;

a locking portion contiguous with the fitting portion and having an outer diameter larger than an inner diameter of the fitting portion when fitted in the circumferential spring fitting groove, the locking portion being formed by winding the wire a plurality of first turns such that the first turns of the wire are adjacent to each other in the direction of the longitudinal axis of the fluid passage;

a valve support portion configured to support the valve element; and an expanding-contracting portion formed by winding the wire a plurality of second turns such that the second turns of the wire are spaced from each other in the direction of the longitudinal axis of the fluid passage, the expanding-contracting portion extending between the locking portion and the valve support portion and having an outer diameter larger than an inner diameter of the locking portion, and the expanding-contracting portion being configured to expand and contract in the direction of the longitudinal axis of the fluid passage when the valve element is displaced between the closed position and the open position.

10. The pipe coupling member of claim 7, wherein the expanding-contracting portion has a uniform diameter along the longitudinal axis of the fluid passage.

\* \* \* \* \*